United States Patent
Buszta et al.

(10) Patent No.: US 6,723,255 B2
(45) Date of Patent: *Apr. 20, 2004

(54) COMPOSITIONS FOR SHORTSTOPPING FREE RADICAL EMULSION POLYMERIZATIONS AND STABILIZING LATICES MADE THEREFROM

(75) Inventors: Thomas S. Buszta, Pottstown, PA (US); Jianfeng Lou, Upper Merion, PA (US); Martin Nosowitz, Berwyn, PA (US)

(73) Assignee: Atofina Chemicals, Inc., Philadelphia, PA (US)

( * ) Notice: Subject to any disclaimer, the term of this patent is extended or adjusted under 35 U.S.C. 154(b) by 33 days.

This patent is subject to a terminal disclaimer.

(21) Appl. No.: 09/784,884

(22) Filed: Feb. 16, 2001

(65) Prior Publication Data

US 2001/0045544 A1 Nov. 29, 2001

Related U.S. Application Data

(60) Provisional application No. 60/187,623, filed on Mar. 7, 2000.

(51) Int. Cl.$^7$ ................................................. C09K 3/00
(52) U.S. Cl. ............................ 252/182.11; 252/182.29; 252/182.32; 252/182.34; 252/182.35
(58) Field of Search ................. 252/182.11, 182.29, 252/182.32, 182.34, 182.35

(56) References Cited

U.S. PATENT DOCUMENTS

| | | | | | |
|---|---|---|---|---|---|
| 3,148,225 | A | * | 9/1964 | Albert | 585/4 |
| 4,293,672 | A | * | 10/1981 | Jackson | 525/507 |
| 4,298,678 | A | * | 11/1981 | McKeever | 430/281.1 |
| 4,654,450 | A | * | 3/1987 | Miller | 585/5 |
| 4,782,105 | A | * | 11/1988 | Ravichandran et al. | 524/236 |
| 4,797,504 | A | * | 1/1989 | Roling | 560/4 |
| 4,876,300 | A | * | 10/1989 | Seltzer et al. | 524/100 |
| 5,176,849 | A | * | 1/1993 | Hwa et al. | 252/392 |
| 5,384,372 | A | * | 1/1995 | Lattime | 526/83 |
| 6,300,533 | B1 | * | 10/2001 | Benage et al. | 585/5 |
| 6,340,729 | B1 | * | 1/2002 | Bonardi et al. | 526/83 |
| 6,495,065 | B1 | * | 12/2002 | Lou et al. | 252/183.12 |

* cited by examiner

*Primary Examiner*—Margaret B. Medley
(74) *Attorney, Agent, or Firm*—Gilbert W. Rudman

(57) ABSTRACT

Disclosed are compositions for shortstopping free radical emulsion polymerizations and stabilizing polymers produced from the corresponding emulsion processes. Such compositions include at least one hydrophillic radical scavenger (i.e, shortstopper) and at least one hydrophobic radical scavenger. The compositions are preferably targeted for applications in the emulsion processes of rubber latexes. These compositions exhibit excellent performance not only as shortstoppers of free radical emulsion polymerizations but also as stabilizers of the corresponding polymers. Thus, the compositions prevent additional polymerization in the particles without requiring additional stabilizer even after such polymers are steam stripped. They do so without the use of chemicals which carry a high safety, health, or environmental risk.

8 Claims, No Drawings

COMPOSITIONS FOR SHORTSTOPPING FREE RADICAL EMULSION POLYMERIZATIONS AND STABILIZING LATICES MADE THEREFROM

REFERENCE TO RELATED APPLICATION

This application claims the benefit of U.S. Provisional Application Serial No. 60/187,623, filed Mar. 7, 2000.

FIELD OF THE INVENTION

This invention relates to compositions for shortstopping of free radical polymerizations and stabilization of polymers produced therein; the compositions include at least one hydrophilic component and at least one hydrophobic component.

BACKGROUND OF THE INVENTION

In emulsion polymerization processes such as those used to synthesize rubber latices, chain growth is often terminated at a designated conversion to prevent the formation of polymer gel and ensure the quality of the resulting polymer. The termination is accomplished by employing a free radical scavenger, commonly referred to as a shortstopper. The action of a shortstopper is to provide hydrogen atoms which combine with the reactive center to terminate growing polymer chains. It is desirable for a shortstopper to destroy any radical initiator remaining in the latex as well.

It is advantageous for a single shortstopping composition to offer both efficient reaction quenching and effective latex stabilization. This avoids the need for complicated equipment and procedures to introduce first the shortstopper and then the latex stabilizer. However, the chemistry of shortstoppers and that of SBR latices precludes any single molecule from performing both functions.

The efficiency of all shortstoppers, and alkylhydroxylamine shortstoppers especially, depends primarily on the ease of active hydrogen atom removal and the degree of access (lack of hindrance) to the active hydrogen atom by the chain radical. Both of these decrease with increasing substitution and increasing alkyl chain length. Thus diethylhydroxylamine (DEHA) is a less active shortstopper than monoethylhydroxylamine, and less active than dimethylhydroxylamine (DMHA). However, minimizing the number of carbons in the molecule also has the effect of raising its volatility and water solubility. These are the properties least desirable for a latex stabilizer, which must persist in the hydrophobic particles when monomers are stripped from the latex. It is often required that the shortstopper have sufficient volatility to inhibit formation of "popcorn" polymer caused by volatile monomer radicals collecting on the walls of stripping columns, and this is defeated by segregation in the particle.

Nitroxides and phenolic compounds have also been studied as shortstoppers for Styrene-Butadiene Rubber (SBR) emulsion polymerizations and as stabilizers for SBR latexes. These compounds can provide good stability for synthetic rubber latexes during storage but do not perform well as shortstoppers for most free radical emulsion processes. Further, most nitroxides and phenolic compounds are costly or toxic, or both, and lack the ability to inhibit overhead popcorn formation.

In order to provide full functionality, shortstoppers have been formulated as binary mixtures of "stopper" and stabilizer. One such mixture, DEHA and sodium dimethyldithiocarbamate (SDDC), was found to be effective in cost and performance. However, as chemical products and processes have come to be more carefully scrutinized, weaknesses in this formulation were exposed. Upon stripping, SDDC emits $CS_2$, a toxic and highly regulated chemical, requiring a scrubber to be installed. In addition, dimethylamine, a potential nitrosamine forming molecule, is emitted. Recently, a formulation containing N-isopropylhydroxylamine (NiPHA) and polysulfides was described. The odor of polysulfides is one drawback to this invention. Another is the lack of overhead popcorn prevention.

The objective of this invention is to offer a shortstopping composition that not only effectively shortstops free radical emulsion polymerization reactions and destroys initiators, but also provides improved stability for the resulting rubber latices without incurring any negative safety, health, or environmental impacts.

The literature discloses many variations on the concept of shortstopping compositions for free radical emulsion polymerizations containing hydroxylamines. In U.S. Pat. No. 3,222,334, Demme discloses the use of N,N-dialkylhydroxylamines as shortstopping agents for use in emulsion processes of synthetic rubber latexes involving dienes and monoolefins. Haines et al. in U.S. Pat. No. 3,296,177, disclose bis-oxalate salts of N-monoalkyl and N,N-dialkylhydroxylamines as effective shortstoppers for both hot and cold emulsion polymerization processes for synthetic rubber latices. Albert et al. discloses a process for shortstopping emulsion polymerizations using dithiocarbamate salt/alkylhydroxylamine mixtures in both hot and cold emulsion styrene-butadiene rubber (SBR) processes in U.S. Pat. No. 3,341,487 and the use of N,N-dialkyl-N,N'-methylenebishydroxylamines as shortstoppers for both hot and cold synthetic rubber emulsion processes in U.S. Pat. No. 3,402,138. Albert et al. disclose the use of diethylaniline-N-oxide as a shortstopper for emulsion process synthetic rubber in U.S. Pat. No. 3,567,700.

Haines et al. describe mixtures of N-alkyl-N-arylhydroxylamines as shortstoppers for hot and cold SBR emulsion polymerizations and as popcorn inhibitors in U.S. Pat. No. 3,697,470.

Mixtures of DEHA with a phenolic antioxidant are claimed as shortstoppers for emulsion polymerization processes involving chloroprene by Tsuyoshi et al. in JP 06,298, 813.

In U.S. Pat. No. 5,384,372, Lattime discloses the use of N-isopropylhydroxylamine (NiPHA) or its salts as shortstoppers for SER emulsion polymerizations wherein the formation of nitrosamines is suppressed. Maestri et al., U.S. Pat. No. 5,504,168, describe the use of mixtures of isopropylhydroxylamine (or salts thereof) and sodium polysulfide as shortstoppers for free radical emulsion polymerizations; the shortstopping composition is alleged not to yield nitrosamines in the resulting rubber latices.

SUMMARY OF INVENTION

Compositions have been developed for shortstopping free radical emulsion polymerizations and stabilizing polymers produced from the corresponding emulsion processes.

Such compositions include at least one hydrophillic radical scavenger (i.e, shortstopper) and at least one hydrophobic radical scavenger.

The compositions are preferably targeted for applications in the emulsion processes of rubber latexes.

These compositions exhibit excellent performance not only as shortstoppers of free radical emulsion polymerizations but also as stabilizers of the corresponding polymers. Thus, the compositions prevent $R_1$ and $R_2$ may each be the same or different, straight, cyclic or branched, and can be hydrogen, $C_{1-20}$-alkyl, hydroxy-$C_{1-20}$ alkyl, $C_{1-10}$ alkoxy-$C_{1-10}$ alkyl, or sulfonated $C_{1-20}$-alkyl groups, with the proviso they may not both be H, or a H and a methyl, and the total carbon number of $R_1$ and $R_2$ together is between 2–20.

The salt forms of the hydroxylamines can also be used. These may be based on carboxylic acids such as formate, acetate, propionate, butyrate, isobutyrate, and valerate. An example would be diethylhydroxylamine formate.

Hydroxylamine salts produced from inorganic acids such as mono- or dialkylhydroxylamines hydrochloride, sulfate, phosphate, perchlorate, carbonate, hydrosulfate and hydrophosphate. N-isopropylhydroxylamine hydrochloride will also be effective shortstop.

Whether the hydroxylamine compound is hydrophilic or hydrophobic depends on the total carbon number: $R_1+R_2$. As a rule of thumb, the alkylhydroxylamine is likely hydrophilic if the total carbon number is 0–6, and likely hydrophobic if the total carbon number greater than 6.

Typical examples of the hydrophillic shortstopper useful in the present invention include diethylhydroxylamine (DEHA), N-isopropylhydroxylamine (NiPHA), and dimethylhydroxylamine (DMHA).

The most preferred hydrophilic alkylhydroxylamine is DEHA.

The hydrophobic free radical scavengers of invention can be based on phenol, nitroxide, and hydroxylamine compounds.

Phenolic compounds useful in the present invention have the general formula:

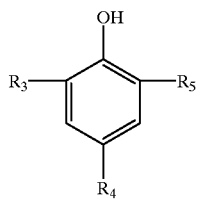

where $R_3$ and $R_5$ may be the same or different, and each group could be hydrogen, alkyl, hydroxyl, or alkaryl groups; $R_4$ could be $C_1-C_{20}$ alkyl, alkaryl, alkylamino, amine, and alkanoic acid ester groups.

The most preferred phenol is 4-methyl-2,6-di-tert-butyl phenol (BHT).

Nitroxide compounds useful in the present invention have the general formula:

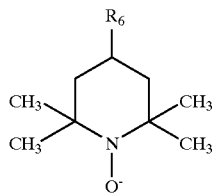

where $R_6$ could be hydrogen, hydroxyl, alkyl, hydroxyalkyl, alkoxyalkyl, and sulfonated alkyl groups. Such nitroxide compounds are usually hydrophobic, and they are based on 2,2,6,6-tetramethyl-1-piperidinyloxy (TEMPO).

Typical examples of the hydrophobic shortstopper include DBHA, dibenzylhydroxylamine (DBzHA), and 2,2,6,6-tetramethyl-1-piperidinyloxy (TEMPO) and its analogs. The most preferred are DBHA and DBzHA.

In a variant of the present invention, each shortstopping component can be introduced into the polymerization system separately, and one or more solvents could be used to deliver each component. Such components could also be added to the rubber latexes after being steam stripped to provide additional latex stability.

A blend of DEHA (hydrophilic) and DBHA (hydrophobic), for example, exhibits excellent overall performance both as a shortstopper for the emulsion process of SBR and as stabilizer for SBR latexes during storage. The obtained latexes, even after being steam-stripped, do not require additional stabilizer to maintain high latex stability. An additional advantage for such a composite shortstopper is that it does not generate any odorous or toxic gases that are subject to environmental regulations.

The disclosed composite shortstoppers can be altered in that their composition could be changed, and various amine, nitroxide, phenolic free radical scavengers could be used. The disclosed shortstopping technology is applicable to a variety of emulsion processes of preparing synthetic rubber latexes. Such polymerization processes typically involve conjugated dienes, particularly, 1,3-butadiene, isoprene, chloroprene and the like, and optionally monoolefin compounds such as styrene, acrylonitrile, acrylic acid, vinyl chloride and the like.

These alternatives are presented based on theory, analogy, and limited experiments.

While the following examples illustrate the use of various materials in embodiments of the invention, it should be clear that there is no intention of so limiting the scope of the invention. On the contrary, it is intended that the breadth of the invention illustrated by reference to the following examples will apply to other embodiments which would be obvious to those skilled in the art.

EXAMPLES

The experiment involves emulsion polymerization processes of preparing SBR latexes where various free radical scavengers are evaluated as a shortstopper for the SBR emulsion processes and as a stabilizer for the corresponding SBR latexes. The polymerization is performed at 10°–12° C. and is based on the following recipe:

| Material | Parts[a] |
|---|---|
| Styrene | 28.0 |
| 1,3-Butadiene | 72.0 |
| Deionized water | 200.0 |
| Surfactant | 4.5 |
| Electrolyte | 0.30 |
| NaFe (chelated iron complex) | 0.02 |
| Sodium formaldehyde sulfoxylate | 0.08 |
| TDM[b] | 0.30 |
| Organic peroxide | 0.05–0.10 |
| KOH[c] | Variable |

[a]Parts by weight per 100 parts of monomer charged.
[b]Tertiary dodecyl mercaptan
[c]The pH was adjusted to 10.5–10.9 by KOH.

In one experiment, the polymerization reactor is discharged at a conversion of ~40%, and the SBR latex is allocated to several containers. Various shortstoppers are added to these containers, and the solid content in these latexes are measured with time. Table 1 lists the conversion (calculated from the solid content) with time for six latex samples. In general, the results show that DEHA, DEHA/SDDC, and DEHA/DBHA all exhibit excellent performance as shortstopper for the emulsion process of SBR.

In another experiment, the polymerization is shortstopped at a conversion of ~60% using 350 ppm DEHA. Various stabilizers are then added to such latex to prevent additional polymerization. The stabilized latexes are coagulated, and the obtained crumb rubber is rolled on a mill without any compounding additives. The Mooney viscosity is measured for such rolled rubber samples, and the results are presented in Table 2. Table 2 shows that DBHA, DBzHA, and DEHA/DBHA exhibit excellent performance as stabilizer for SBR latexes.

In summary, the DEHA/DBHA blend not only effectively shortstops the SBR emulsion process but also efficiently stabilizes the corresponding SBR latex during storage.

TABLE 1

Solid content versus time in the presence of 400 ppm various shortstoppers.[a]

| Time, Day | Control[b] | DEHA | DEHA/ SDDC[c] | DEHA/ DBHA[c] | DBHA | NiPHA |
|---|---|---|---|---|---|---|
| 0 | 15.103% | 13.506% | 14.949% | 13.828% | 14.587% | 14.495% |
| 0.5 | 17.443% | 11.577% | 15.355% | 13.689% | 14.388% | 15.215% |
| 4 | 18.631% | 12.357% | 14.979% | 13.389% | 14.907% | 15.109% |
| Change[d] | 23.4% | −8.5% | 0.2% | −3.2% | 2.2% | 4.2% |

[a]Shortstopper concentration is based on the amount of SBR latex. Errors associated with the conversion measurements are within ±5%.
[b]No shortstopper is added to the latex.
[c]The concentration of each component is 200 ppm.
[d]The change in solid content after a four-day storage.

TABLE 2

Mooney viscosity of SBR rubber samples with various stabilizers in their corresponding SBR latexes[a]

| Time, Day | 0 | 3 | 4 | 5 | 7 |
|---|---|---|---|---|---|
| Control[b] | 48 | 122 | 129 | 135 | 142 |
| DEHA | 48 | 52 | 58 | 63 | 86 |
| NiPHA | 48 | 54 | 54 | 62 | 80 |
| DBHA | 48 | 50 | 50 | 56 | 80 |
| DbzHA | 48 | 48 | 49 | 52 | 80 |
| DEHA/DBHA[c] | 48 | 51 | 51 | 60 | 83 |
| DEHA/DBzHA[c] | 48 | 58 | 92 | | |

[a]350 ppm DEHA is already present in SBR latex as shortstopper. Additional alkylhydroxylamines are added to such latexes as latex stabilizer. Stabilizer concentration: 200 ppm DEHA or its molar equivalence. Latex stabilization experiments were performed at 70° C.
[b]No additional stabilizer is added to the corresponding SBR latex.
[c]The concentration of each component is either 100 ppm DEHA or its molar equivalence.

While specific embodiments have been described herein, it should be apparent to those skilled in the art that various modifications thereof can be made without departing from the true spirit and scope of the invention. Accordingly, it is intended that the following claims cover all such modifications within the full inventive concept.

What is claimed is:

1. A synthetic rubber latex free-radical stopping composition composition comprising:

a) at least one hydrophilic mono- or di-substituted alkylhydroxylamine shortstopping agent wherein said alkyl substitution is a $C_{1-3}$ alkyl; and b) at least one hydrophobic disubstituted hydroxylamine free radical shortstopping agent wherein the substitutions are the same and each substitution is a $C_{4-10}$ alkyl.

2. The composition of claim 1 dissolved in a solvent medium.

3. The composition of claim 2 wherein the solvent medium is water, alcohol, a common organic solvent, or mixture thereof.

4. The composition of claim 1 wherein the ratio of the hydrophilic to hydrophobic shortstopper ranges from 95/5 to 5/95.

5. The composition of claim 4, wherein the ratio is between 40/60 to 90/10.

6. The composition of claim 1, wherein the hydrophilic agent is diethylhydroxylamine, N-isopropylhydroxylamine, dimethylhydroxylamine or mixtures thereof.

7. The composition of claim 1, wherein the hydrophobic agent is dibutylhydroxylamine, dibenzylhydroxylamine or mixtures thereof.

8. The composition of claim 1 wherein the hydrophilic agent is diethylhydroxylamine, and the hydrophobic agent is dibutylhydroxylamine.

* * * * *